Patented Mar. 18, 1952

2,589,663

UNITED STATES PATENT OFFICE 2,589,663

REMOVAL OF MERCAPTANS FROM HYDROCARBONS

Donald C. Bond, Northbrook, Ill., assignor to The Pure Oil Company, Chicago, Ill., a corporation of Ohio No Drawing. Application March 4, 1944, Serial No. 525,096

9 Claims. (Cl. 23—184)

This invention relates to the removal of mercaptans from hydrocarbon liquids by means of aqueous alkali solutions and to regeneration of the solution.

The removal of mercaptans from hydrocarbon oils by extraction with aqueous solutions of sodium or potassium hydroxide which may or may not contain solubility promoters is well known. One such process in commercial use is known as the "Solutizer" process and utilizes a potassum hydroxide solution containing sodium isobutyrate as a solubility promoter. Another process in commercial use is known as the "Mercapsol" process, and utilizes aqueous soduim hydroxide containing as solubility promoter sodium salts of naphthenic acids and a solventizer for the naphthenic acids, such as commercial cresols.

In the past it has been customary to regenerate the used alkali treating solutions by stripping with steam in order to hydrolyze the mercaptides to mercaptans and drive them from the treating solution as vapor. Recently the regeneration of used alkali solutions by means of air blowing at temperatures ranging from atmospheric to about 130° F. has been proposed. In order to accelerate regeneration of the used alkali solutions by means of air it has also been proposed to incorporate in the treating solution a small amount of an oxidation accelerator such as tannic acid, pyrogallic acid and wood tar fractions boiling between approximately 240° and 300° C. obtained from destructive distillation of hardwood.

Although air regeneration is more economical than steam regeneration of used alkali, air regeneration has several drawbacks. Air regeneration will destroy the oxidation accelerator unless sufficient mercaptan is allowed to remain in the treating solution to act as an inhibitor against oxidation of the oxidation accelerator. However, if too much mercaptan is left in the treating solution the effectiveness of the treating solution in extracting mercaptan from the hydrocarbon liquid is detrimentally affected. If too much mercaptan is left in the treating solution instead of extracting mercaptans from the hydrocarbon liquid, additional mercaptan may be put into the liquid during the treating step.

The aforementioned difficulties are particularly troublesome in connection with treatment of hydrocarbon liquids containing propyl, butyl and higher mercaptans in excess of the amount of methyl and ethyl mercaptan, such as would be the case where a heavy naphtha, as for example, one having an initial boiling point of about 150° F. or higher, was treated. In such cases the used alkali from the treatment of the oil may contain substantially no ethyl or methyl mercaptides or may contain a small amount of ethyl or methyl mercaptides in comparison to the content of propyl, butyl and higher mercaptides. Since these various mercaptides are oxidized at approximately the same rate during air blowing in order to protect the oxidation accelerator, propyl, butyl and higher mercaptides will necessarily be present at the end of the air regeneration. If the mercaptides are entirely oxidized to disulfides, the oxidation accelerator will be destroyed, thereby necessitating addition of further quantities of these expensive chemicals.

An object of my invention is to provide an improved method for extracting mercaptans from hydrocarbon liquids.

Another object of my invention is to provide an improved method for air regeneration of used alkali solutions from the extraction of mercaptans from hydrocarbon oils.

Other objects of my invention will appear from the following disclosure.

In accordance with my invention, I provide an excess of ethyl and methyl mercaptans over propyl, butyl and higher mercaptans in the used alkali solutions containing oxidation accelerator before it is subjected to air regeneration. When treating a particular gasoline or other hydrocarbon oil, containing mercaptans, with an alkali treating solution, the proportion of ethyl and methyl mercaptans and the proportion of propyl, butyl and higher mercaptans present in the used alkali as mercaptides is determined. Sufficient methyl and/or ethyl mercaptans are added to the used alkali so that sulfur in the form of methyl and/or ethyl mercaptides is present in the treating solution in an amount at least approximately 0.3 percent by weight in excess of the amount of sulfur as propyl, butyl and higher boiling mercaptides. Ordinarily an excess of about 1 percent of sulfur as ethyl and/or methyl mercaptide over sulfur as the higher boiling mercaptides is sufficient. The regeneration of the treating solution by air blowing is then carried out until the mercaptan sulfur content of the regenerated solution is not less than 0.2 percent by weight nor more than approximately 1 percent by weight, and preferably between 0.3 and 0.6 percent by weight. I have found that where the ethyl and/or methyl mercaptide sulfur content of the regenerated alkali solution has been reduced to not more than approximately 1 percent by weight, the solution is effective for extracting further quantities of mercaptans from hydrocarbon oil. It has further been found that a minimum of approximately 0.2 percent by weight of mercaptan sulfur must be left in the treating solution to avoid destruction of the oxidation accelerator.

On the other hand I have found that if sulfur in the form of mercaptides higher boiling than the ethyl mercaptide are left in the treating solution in such amount that it is approximately 0.2 percent by weight or greater, the solution is ineffective for removing mercaptans from the hydrocarbon liquid.

In order to demonstrate the effect of different mercaptans in the alkali treating solution, a series of tests were made with two different treating solutions. One treating solution was a 5 N aqueous sodium hydroxide solution containing sodium para-cresylate in an amount equivalent to 1 normal concentration, and also containing 1 percent by weight of tannic acid. Another solution was prepared by mixing together 56 percent by weight of water, 6.3 percent of meta-para-cresols; 18.7 percent of naphthenic acids and 18.3 percent of sodium hydroxide. The latter solution is disclosed in Patent No. 2,297,621. The tests were made in laboratory glass apparatus. The apparatus was first flushed with nitrogen which had been passed through alkaline pyrogallol solution to remove any oxygen. 50 cc. of the treating solution was poured into a graduated tube and the treated nitrogen was bubbled through the solution slowly for ten minutes in order to remove any dissolved oxygen. 100 cc of the gasoline sample to be treated was then poured into a treating tube and nitrogen was bubbled through the gasoline for ten minutes to remove any dissolved oxygen. The 100 cc. of gasoline was then treated with treating solution in 5 doses of 7 cc. each, mixing being effected by means of nitrogen for ten minutes. The treated gasoline was then analyzed for mercaptan and disulfide sulfur. The results obtained in the tests are set forth in the following table. The original gasoline had a mercaptan sulfur content of 0.02 by weight and a disulfide sulfur content of less than 0.001 percent by weight.

Table

| Test No. | Testing solution | Mercaptan Added | Wt. Per cent Mercaptan Added | Wt. Per cent RSH-S in after treatment | Wt. Per cent RSI-S in Gasoline after treatment |
|---|---|---|---|---|---|
| 1 | H₂O / 5 N NaOH / 1 N Na-p-cresylate / 1 per cent by wt. Tannic Acid | Ethyl | 0.2 | 0.003 | 0.001 |
| 2 | H₂O / 5 N NaOH / 1 N Na-p-cryselate / 1 percent by wt. Tannic Acid | Ethyl | 1.0 | 0.011 | 0.001 |
| 3 | H₂O / 5 N NaOH / 1 N Na-p-cresylate / 1 percent by wt. Tannic Acid | n-butyl | 0.2 | 0.025 | 0.002 |
| 4 | H²O / 5 N NaOH / 1 N Na-p-cresylate / 1 percent by wt. Tannic Acid | n-butyl | 1.0 | 0.089 | 0.008 |
| 5 | Per cent by wt.: H₂O, 56.7 / m, p-cresols, 6.3 / Napthenic Acids, 18.7 / NaOH, 18.3 | Ethyl | 0.2 | 0.004 | 0.003 |
| 6 | Per cent by wt.: H₂O, 56.7 / m, p-cresols, 6.3 / Napthenic Acids, 18.7 / NaOH, 18.3 | Ethyl | 0.5 | 0.007 | 0.001 |
| 7 | Per cent by wt.: H²O, 56.7 / m, p-cresols, 6.3 / Napthenic Acids, 18.7 / NaOH, 18.3 | n-butyl | 0.2 | 0.017 | 0.001 |
| 8 | Per cent by wt.: H²O, 56.7 / m, p-cresols, 6.3 / Napthenic Acids, 18.7 / NaOH, 18.3 | n-butyl | 0.5 | 0.031 | 0.001 |

From the table it will be seen that by reason of the precautions taken, substantially no increase in disulfide sulfur content of the gasoline occurred. Where ethyl mercaptan was added to the treating solution up to 1% by weight, the treating solution was still effective in extracting mercaptans from the gasoline. With 0.5 percent by weight of ethyl mercaptan, the mercaptan sulfur content of the gasoline was reduced to 0.007, which is sufficiently low to remove objectionable odor from the gasoline and to meet commercial requirements.

On the other hand with only 0.2 percent by weight of n-butyl mercaptan present in the treating solution, not only was substantially no mercaptan removed from the gasoline but in one case the mercaptan sulfur content of the gasoline increased. As previously pointed out 0.2 percent by weight of mercaptan sulfur is the minimum amount required in the treating solution to protect the oxidation accelerator from destruction during the air regeneration.

Instead of adding the necessary amount of methyl and/or ethyl mercaptan to the treating solution prior to air regeneration, air regeneration may be effected in two stages, in the first of which air regeneration is carried out without addition of methyl and/or ethyl mercaptan until the mercaptan sulfur content is reduced to approximately 0.2 to 0.6% by weight, whereupon sufficient methyl and/or ethyl mercaptan is added so that when the content of propyl, butyl and higher mercaptans has been reduced below 0.2% and preferably much lower, the total mercaptan sulfur content of the treating solution will be not less than 0.2% and preferably from approximately 0.3 to 0.6 percent by weight.

Methyl and ethyl mercaptans for use in the process may be obtained from any available source. One method of obtaining such mercaptans is by extraction from hydrocarbon oil fractions rich in methyl and/or ethyl mercaptans and poor in higher boiling mercaptans, as for example, by extraction of a hydrogen sulfide-free gasoline fraction having an end point of approximately 200° F. or less with aqueous or alcoholic sodium or potassium hydroxide solution and regeneration of the solution by means of steam stripping. Ethyl and methyl mercaptans can be readily extracted from hydrocarbon liquids by either alcoholic or aqueous sodium or potassium hydroxide solutions and can be readily separated from the resulting solution by hydrolysis with the steam at temperatures of approximately 220°-250° F.

Thus my invention is applicable to treatment of oils or distillates wherein the oil or distillate is fractionated into two fractions, one having an end point of approximately 200° F. or lower and the other having an initial boiling point of 150° F. or higher, the low boiling fraction is treated with aqueous caustic alkali solution sufficiently concentrated to extract ethyl and methyl mercaptans followed by steam stripping, the high boiling fraction is treated with an aqueous caustic alkali solution containing a solubility promoter and a small percent of an oxidation accelerator and the latter solution is regenerated by means of air blowing at temperatures of approximately atmospheric to approximately 130° F. in the presence of sufficient mercaptans recovered from the steam regeneration of the alkali solution from the treatment of the low boiling fraction to inhibit oxidation of the oxidation accelerator.

Air regeneration of used alkali solution oxidizes the mercaptide sulfur to disulfides which can be separated from the used alkali solution by decantation and recovered. The regenerated alkali solution may be recirculated for further use either with or without additional treatment such as washing with naphtha to remove any suspended disulfides and/or blowing with steam or other non-oxidizing gas to remove occluded oxygen. As oxidation accelerators which are useful in the air regeneration of used alkali may be mentioned: tannic acid; pyrogallic acid; butyl pyrogallol; 2,5 dihydroxy diphenyl; 3,4 dihydroxy diphenyl; nitroso beta naphthol; quinhydrone, anthragallol, wood tar fraction boiling from 240° to 300° C. and mono-butyro pyrogallol. These catalysts are effective when present in amounts of approximately 0.1 to 3 percent by weight.

In addition to its effect in inhibiting oxidation of the oxidation accelerator, ethyl mercaptans when present in the caustic soda solution in amounts equivalent to a sulfur content between approximately 0.2 and 0.6% by weight permits more rapid regeneration than lesser or greater amounts of mercaptan. 50 cc. portions of a solution such as that used in tests 5 to 8 of the table and containing in addition 1 percent by weight of U. O. P. Inhibitor #1 (hardwood tar fraction boiling between 240° and 300° C.) were tested by adding various amounts of ethyl mercaptan and then blowing with air at 100° F. at the rate of 0.03 cubic feet per hour. Whereas only 21% of the mercaptan was oxidized to disulfide when 0.2% by weight of mercaptide sulfur was present and 20% was oxidized when 0.8% by weight of mercaptide sulfur was present, from 31 to 35% of mercaptides were oxidized when the initial mercaptan sulfur content was between 0.2 and 0.6% by weight.

It is claimed:

1. In the treatment of hydrocarbon oils containing heavy mercaptides for the removal thereof which comprises contacting oil containing heavy mercaptides with aqueous alkali metal hydroxide reagent containing an effective amount of soluble organic oxidation promoter itself capable of oxidation and an amount of mercaptides sufficient to protect said promoter to extract said mercaptans and to produce a fat reagent containing heavy mercaptides, separating said fat reagent, regenerating said fat reagent by passing oxygen-containing oxidizing gas therethrough to oxidize a portion of said mercaptides to disulfides and to retain sufficient of said mercaptides to protect said promoter, separating said disulfides to produce a lean reagent, and contacting hydrocarbon oil containing heavy mercaptides with said lean reagent, the improvement which comprises contacting hydrocarbon oil containing predominantly heavy mercaptans with aqueous alkali metal hydroxide reagent containing an effective amount of soluble organic oxidation promoter itself capable of oxidation and an amount of mercaptides sufficient to protect said promoter to extract heavy mercaptans and to produce a fouled reagent containing heavy mercaptides, introducing light mercaptans into said fouled reagent in an amount sufficient to ensure substantially complete oxidation of said heavy mercaptides to disulfides whilst oxidizing a portion of said light mercaptides during regeneration and to retain sufficient mercaptides comprising substantially only light mercaptides to protect said soluble organic oxidation promoter after regeneration, regenerating said fouled reagent by passing oxygen-containing oxidizing gas therethrough to oxidize substantially all of said heavy mercaptides and a portion of said light mercaptides to disulfides whilst retaining an amount of mercaptides comprising substantially only light mercaptides sufficient to protect said promoter, and separating said disulfides to obtain a lean reagent containing a protective amount of mercaptan sulfur comprising substantially only light mercaptides.

2. In the treatment of hydrocarbon oils containing heavy mercaptans comprising extraction of said mercaptans with aqueous alkali metal hydroxide solution, regeneration of the separated solution by oxidation of the mercaptides to disulfides in the presence of an oxidation promoter susceptible to destructive oxidation, separation of the disulfides from the regenerated solution, and reuse of the regenerated solution for extraction of further quantities of mercaptides from hydrocarbon oils, the improvement comprising adding to the alkali solution, after separation from said oil, sufficient quantity of light mercaptans to protect said oxidation promoter during regeneration, regenerating the fouled solution by intimate contact with oxygen-containing oxidizing gas until substantially all heavy mercaptides are oxidized to disulfides while leaving in the solution sufficient light mercaptides to protect the promoter, separating disulfides from the solution to obtain a lean solution and reusing the solution to extract further quantities of heavy mercaptans from hydrocarbon oils.

3. The treatment in accordance with claim 2 in which the heavy mercaptans are propyl and heavier mercaptans and the light mercaptans are from the group consisting of methyl and ethyl mercaptans.

4. The treatment in accordance with claim 2 in which the hydrocarbon oil contains an excess of heavy mercaptans over light mercaptans.

5. The treatment in accordance with claim 2 in which the amount of mercaptans left in the regenerated solution is not less than 0.2 percent.

6. The treatment in accordance with claim 2 in which the fouled solution is partially regenerated prior to adding the light mercaptans in order to reduce the content of heavy mercaptides but not below an amount sufficient to protect the oxidation promoter; and the light mercaptans are then added and regeneration continued until substantially complete extinction of the heavy mercaptides.

7. The treatment in accordance with claim 6 in which the fouled solution is partially regenerated to a point at which it contains approximately 0.2 to 0.6% mercaptide sulfur prior to adding the light mercaptans.

8. The method of removing mercaptans from hydrocarbon oils comprising extracting mercaptans from an oil rich in light mercaptans and lean in heavy mercaptans, extracting heavy mercaptans from hydrocarbon oil rich in heavy mercaptans and lean in light mercaptans by contact with an aqueous alkali metal hydroxide solution containing a small amount of an oxidation promoter susceptible to destructive oxidation, adding sufficient light mercaptans from said first mentioned extraction to the fouled solution from the second mentioned extraction in order to protect said promoter and regenerating the fouled solution by intimate contact with an oxidizing gas containing free oxygen until the heavy mercaptides are substantially completely oxidized to disulfides while retaining sufficient light mercaptides to protect the promoter.

9. The method in accordance with claim 8 in which the light mercaptans are extracted in the first mentioned extraction with aqueous alkali metal hydroxide solution and the mercaptans stripped from the solution by means of steam.

DONALD C. BOND.

REFERENCES CITED

The following references are of record in the file of this patent:

UNITED STATES PATENTS

| Number | Name | Date |
|---|---|---|
| 1,970,583 | Stagner | Aug. 21, 1934 |
| 2,270,667 | Caselli et al. | Jan. 20, 1942 |
| 2,273,104 | Heilman | Feb. 17, 1942 |
| 2,324,927 | Heilman | July 20, 1943 |